United States Patent
Monteith

[11] Patent Number: 5,725,760
[45] Date of Patent: Mar. 10, 1998

[54] ENHANCED SEPARATOR TANK

[75] Inventor: Joseph Gordon Monteith, Mississauga, Canada

[73] Assignee: Stormceptor Corporation, Rockville, Md.

[*] Notice: The term of this patent shall not extend beyond the expiration date of Pat. No. 5,498,331.

[21] Appl. No.: 642,651

[22] Filed: May 3, 1996

[51] Int. Cl.⁶ .................................... B01D 21/02
[52] U.S. Cl. .................. 210/170; 210/521; 210/532.1; 210/538
[58] Field of Search .................. 210/154, 170, 210/521, 532.1, 538, 540

[56] References Cited

U.S. PATENT DOCUMENTS

| | | |
|---|---|---|
| 942,907 | 12/1909 | Huff. |
| 1,237,068 | 8/1917 | Loeb .................... 210/538 |
| 1,844,443 | 2/1932 | Schmidt. |
| 2,393,498 | 1/1946 | Miller ................... 210/538 |
| 2,764,545 | 9/1956 | Primich ................. 210/538 |
| 3,221,881 | 12/1965 | Weiler et al. .......... 210/136 |
| 3,282,436 | 11/1966 | Malm ................. 210/532.1 |
| 3,374,894 | 3/1968 | Webster .............. 210/532.1 |
| 3,567,024 | 3/1971 | McCormick ............ 210/170 |
| 3,779,385 | 12/1973 | Strohecker ............ 210/154 |
| 4,073,734 | 2/1978 | Lownie ................ 210/532.1 |
| 4,136,010 | 1/1979 | Pilie et al. ............ 210/164 |
| 4,578,188 | 3/1986 | Cousino ............... 210/532.1 |
| 4,985,148 | 1/1991 | Monteith ............. 210/532.1 |
| 5,298,172 | 3/1994 | Smith ................. 210/154 |
| 5,498,331 | 3/1996 | Monteith ............. 210/170 |

*Primary Examiner*—Christopher Upton
*Attorney, Agent, or Firm*—Shoemaker and Mattare, Ltd.

[57] ABSTRACT

A tank interceptor for rain water and waste-water includes a container divided by a partition into an upper by-pass compartment and a lower treatment compartment. An inlet and outlet for the container are located in the side wall adjacently above the partition. The partition defines a raised weir which constrains liquids entering at low flow rates to pass downwardly through an adjacent opening through the partition, to collect in the treatment compartment below the partition. A second opening through the partition is located adjacent the outlet, and pipes are associated with both openings. One of the openings is made large enough to allow passage of maintenance personnel, thus obviating the need for a further access opening and a liquid-tight seal for that further opening. An access opening at the top of the container is generally aligned with the large-diameter opening through the partition, thus allowing inspection, sampling and pumping out, without requiring maintenance personnel to enter the container.

7 Claims, 2 Drawing Sheets

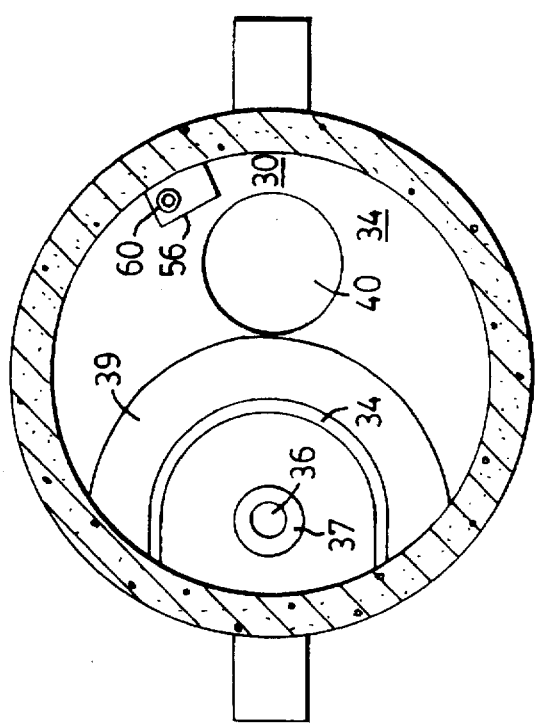
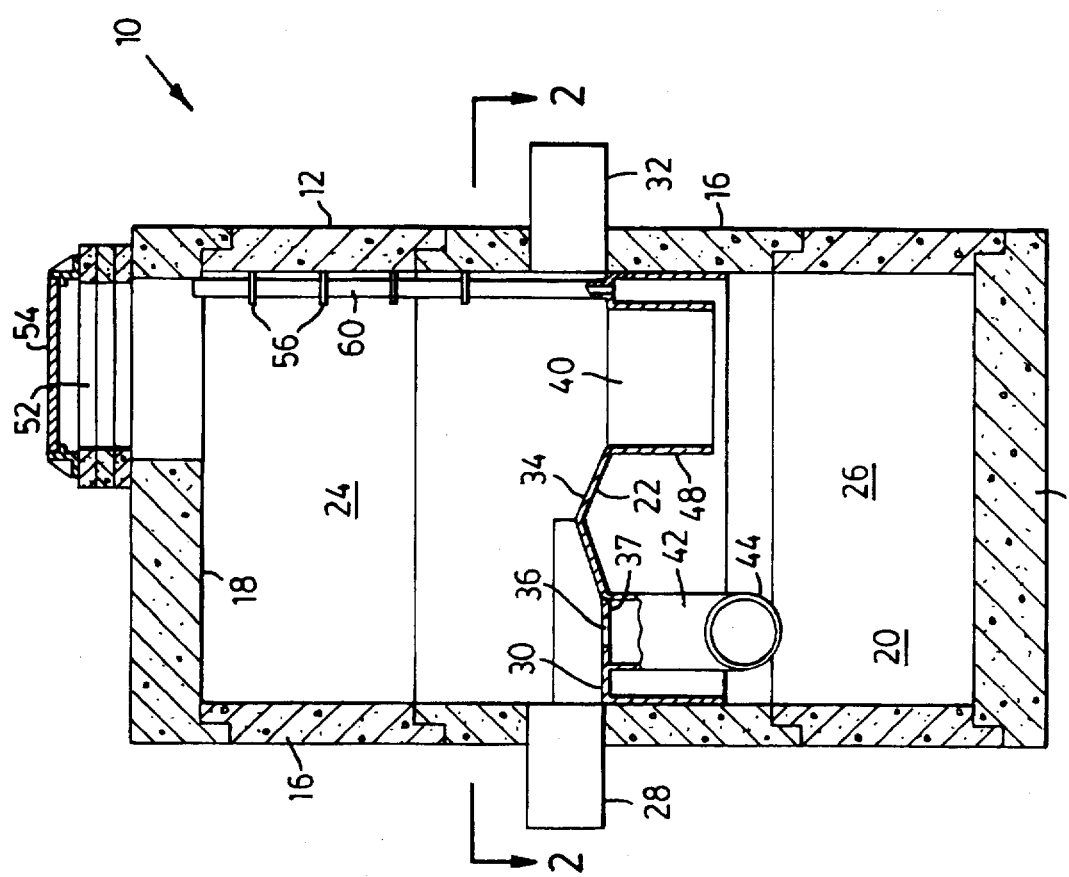

ENHANCED SEPARATOR TANK

This invention relates generally to separator tanks, sometimes called interceptors, adapted to receive primarily rainwater from a storm sewer or drain, and additionally to perform the function of separating and entrapping any oil- or gasoline-based materials and suspended solids that may enter, allowing the water fraction to discharge into municipal receiving sewers or water courses. Prior art devices of this kind are typically equipped with various baffles and chambers operating in such a way as to collect specific components of the waste fluid and separate them from others.

In this connection, reference may be had to U.S. Pat. No. 4,136,010, issued Jan. 23, 1979 to Pilie et al.

Other patents, only peripherally related to the subject matter of this specification, are as follows:

U.S. Pat. No. 1,844,443, Schmidt, Feb. 9, 1932;

U.S. Pat. No. 942,907, Huff, Dec. 14, 1909;

U.S. Pat. No. 3,567,024, McCormick, Mar. 2, 1971;

U.S. Pat. No. 3,221,881 Weiler et al, Dec. 7, 1965.

PRIOR ART

An improved construction is the subject of my U.S. Pat. No. 4,985,148, issued Jan. 15, 1991, and entitled, "Improved Separator Tank Construction". The purpose of the tank interceptor set forth in the latter patent is to provide two distinct responses to two different operating conditions:

(1) When the materials entering the interceptor include discharge from a service station, garage, machine shop, factory or the like, or oil that has spilled accidentally, these non-aqueous materials are collected within the interceptor. The aqueous fraction is allowed to leave the interceptor and pass on to a storm sewer or the like, but the liquid fraction made up of oil or fat of animal, vegetable or mineral origin, gasoline and the like remains trapped within the interceptor until the same is pumped out. Further, any heavier-than-water materials sink to the bottom of the interceptor and are confined to a particular location from where they can also be pumped out at intervals.

(2) The interceptor of the prior invention is also adapted to deal with inflow resulting from heavy rain during a storm. Such inflow would typically be a combination of storm drainage from an adjacent industrial property, garage or the like, as well as inflow from storm drains adapted to catch rainwater. When peak flows during a heavy rain storm arrive at the interceptor of the prior invention, the interceptor automatically diverts most of this peak flow directly to an outlet opening which passes it directly to a storm sewer. Only a portion of the peak flow of the incoming rainwater is allowed through the treatment/storage chamber of the interceptor.

To accomplish the aforesaid goals, my prior art separator provides, within the tank-like interceptor, a passageway extending substantially directly between the inlet and the outlet. The passageway is essentially sealed from communication with the remainder of the interior of the tank interceptor, except for an opening adjacent the inlet and an opening adjacent the outlet. Each opening communicates the passageway with the remainder of the tank interior, which may be regarded as a treatment chamber. Finally, a weir means is provided within the passageway, disposed with respect to the first opening such that, under relatively low entry flow rates, all entering materials are contained by the weir and flow through the first opening and into the treatment chamber, whereas under relatively high entry flow rates, part of the entering material overflows the weir and is delivered by the passageway to the outlet.

Recognizing that it was not necessary for the entire volume inside the interceptor tank (except for the passageway means) to be used as a treatment chamber, and in view of the desirability of making the means providing the high-flow passageway more fully accessible to personnel wishing to inspect the installation for damage, improper accumulations of materials, etc., I developed an improved version of the separator tank construction, in which a treatment compartment was provided in the bottom portion thereof and a by-pass compartment in the top portion thereof (the latter being a convenient area where inspection personnel may stand). The improved version just mentioned is the subject of U.S. Pat. No. 5,498,331, issued Mar. 12, 1996.

More particularly, the improved version provides a tank interceptor for rainwater and waste-water, including a container having a bottom wall, a side wall and a top wall which together define an internal chamber, a partition dividing the chamber into a by-pass compartment above the partition and a treatment compartment below the partition, the partition having an upper surface, a main inlet through the side wall above the partition, adapted to permit liquid to flow into the by-pass compartment, an outlet adjacently above the upper surface and spaced away from the inlet, the outlet being adapted to permit liquid to flow out of the by-pass compartment. The upper surface of the partition is configured to include a raised portion which isolates the inlet from the outlet, the raised portion constituting a weir, such that liquid entering at the inlet and seeking to reach the outlet through the by-pass compartment must overflow the weir in order to do so. The partition has first and second openings on opposite sides of the raised portion of the upper surface of the partition, both openings communicating the by-pass compartment with the treatment compartment, and allowing liquid, without having to overflow the raised portion, to travel from the inlet to the outlet by passing through the treatment compartment. Each of the first and second openings communicates with the top of a respective vertical pipe, each pipe having a bottom end communicating with the treatment compartment.

Because it is necessary to allow personnel to inspect, clear and/or repair portions of the treatment compartment below the partition, the container of U.S. Pat. No. 5,498,331 is provided with an inspection opening in the partition, large enough to allow maintenance personnel to pass through, along with a man-hole cover adapted to close the inspection opening in a liquid-tight manner.

I have now realized that the provision of the inspection opening just mentioned (closable by a man-hole cover) was an unnecessary complexity, and that it could be dispensed with by making one of the openings through the partition (the openings connected to the respective pipes) large enough to allow maintenance personnel to pass through and into the treatment compartment. Preferably, the access opening at the top of the container (allowing access to the by-pass compartment) is positioned in alignment with the large-diameter partition opening, to allow visual inspection and sampling from outside the container, and to facilitate the entry of a snorkel for the purpose of pumping out the contents of the treatment compartment.

GENERAL DESCRIPTION OF THIS INVENTION

More particularly, this invention provides a tank interceptor for rainwater and waste-water, comprising:

A container including a bottom wall, a side wall and a top wall, said walls defining an internal chamber, a partition dividing the chamber into a by-pass compartment above the partition and a treatment compartment below the partition, the partition having an upper surface, an inlet through the side wall adjacently above said upper surface of the partition, the inlet being adapted to permit liquid to flow into the by-pass compartment, an outlet through the side wall adjacently above the upper surface of the partition, the outlet being adapted to permit liquid to flow out of said by-pass compartment, the upper surface of the partition being configured to include a raised portion which isolates the inlet from the outlet, while being spaced from the top wall of the container, the raised portion requiring that liquid entering through the inlet and seeking to reach the outlet through the by-pass compartment must overflow the raised portion in order to do so, first and second openings through the partition on the inlet side and the outlet side, respectively, of the raised portion, a first pipe commencing substantially at said first opening, extending downward therefrom, and opening into said treatment compartment at an intermediate vertical location therein, a second pipe commencing substantially at said second opening, extending downward therefrom, and opening into said treatment compartment at an intermediate vertical location therein.

whereby said openings and pipes communicate the by-pass compartment with the treatment compartment, the openings and corresponding pipes being such that liquid, without having to overflow said raised portion, can travel from the inlet to the outlet by passing through the first opening into the treatment compartment, thence through the treatment compartment, thence through the second opening into the by-pass compartment, thence to the outlet, one of said openings and the corresponding pipe having an internal diameter large enough to allow passage of a maintenance worker from said by-pass compartment into said treatment compartment, an access opening through the top wall of the container, positioned such that maintenance personnel can, without having to enter the container, pass a snorkel through the access opening and said one of the openings in the partition, in order to pump out the contents of the treatment compartment.

GENERAL DESCRIPTION OF THE DRAWINGS

One embodiment of this invention is illustrated in the accompanying drawings, in which like numerals denote like parts throughout the several views, and in which:

FIG. 1 is a vertical, axial sectional view of an interceptor container embodying this invention;

FIG. 2 is a lateral sectional view of FIG. 1, taken at the line 2—2;

DETAILED DESCRIPTION OF THE DRAWINGS

Figure 4:
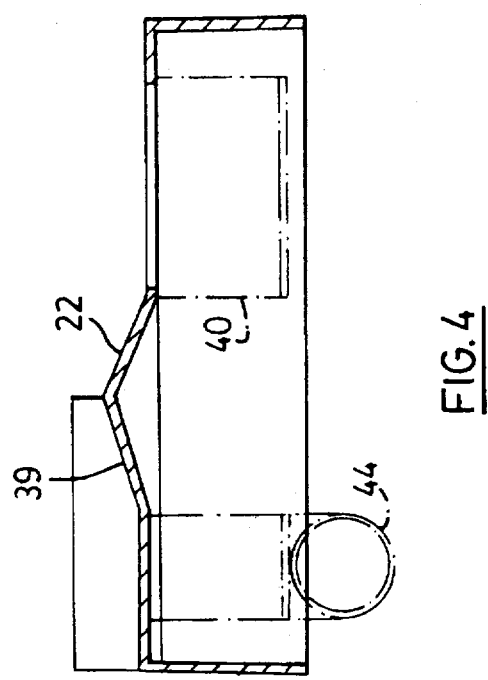
FIG. 4 is a vertical sectional profile of the partition of FIG. 3.
Figure 3:
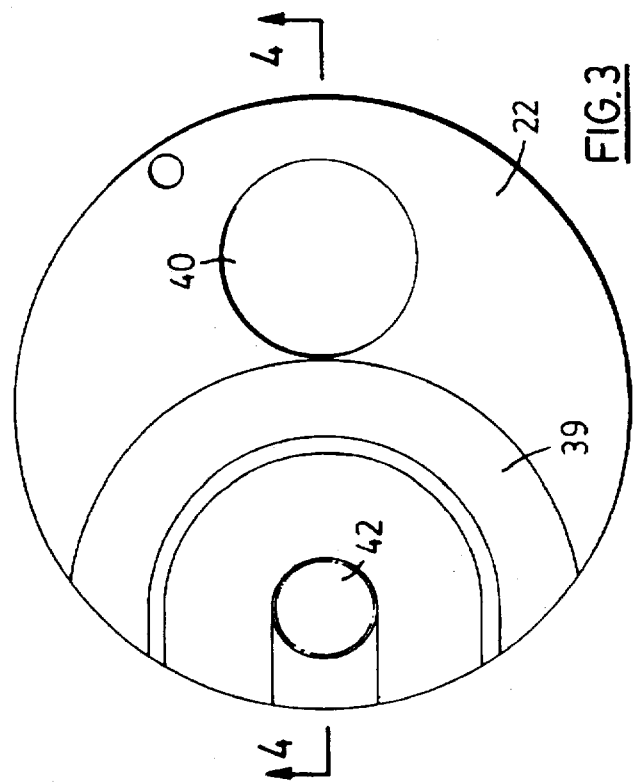
FIG. 3 is a plan view of a partition for use with this invention.

Attention is first directed to FIG. 1, in which a tank interceptor is shown generally at the numeral 10. The tank interceptor 10 is in a form of a container 12 which has a circular bottom wall 14, a cylindrical side wall 16 (made of interlocking sections) and a substantially circular top wall 18.

The walls 14, 16 and 18 define an internal chamber 20 which is divided, by a partition 22, into a by-pass compartment 24 above the partition 22, and a treatment compartment 26 below the partition 22.

The construction shown in FIG. 1 provides an inlet 28 through the side wall 16 adjacently above the upper surface 30 of the partition 22, the inlet 28 being adapted to permit liquid to flow into the by-pass compartment 24. At a peripheral location on the side wall 16 which is spaced away from the inlet 28, the illustrated construction provides an outlet 32 through the side wall 16 adjacently above the upper surface of the partition 22, the outlet 32 being adapted to permit liquid to flow out of the by-pass compartment 24. Typically, the outlet 32 would be located slightly lower than the inlet 28, to provide a gradient that promotes flow through the tank interceptor.

While FIG. 1 shows the inlet and outlet to be approximately diametrally opposed, this is not essential.

The upper surface 30 of the partition 22 is configured in such a way as to include a raised portion 34 which isolates the inlet 28 from the outlet 32, while being spaced below the top wall 18 of the container 12. The raised portion 34 requires that liquid entering through the inlet 28 and seeking to reach the outlet 32 through the by-pass compartment 24 must overflow the raised portion 34 in order to do so.

The partition 22 exhibits a first opening 36 on the inlet side of the raised portion 34, and a second opening 40 on the outlet side of the raised portion 34. Preferably, the opening 36 is provided by an annular insert 37 which is one of several inserts having different opening sizes, to accommodate different average flow-rates or different interceptor sizes.

Attention is now directed to FIG. 1, which shows a first pipe 42 which begins at the opening 36, extends downward therefrom, and opens into the treatment compartment 26 at an intermediate vertical location therein. More specifically, the first pipe 42 terminates at a T-connection 44 set at right angles to a radius, thus promoting circumferential movement of any liquid entering the compartment 26 at the bottom of the pipe 42.

A second pipe 48 commences at the second opening 40 and extends downward therefrom, opening into the treatment compartment 26 at an intermediate vertical location therein.

Thus the openings 36 and 40, along with the associated pipes 42, 48, respectively, communicate the by-pass compartment 24 with the treatment compartment 26.

It will thus be understood that the openings 36, 40 and the corresponding pipes 42, 48 are such that liquid, without having to overflow the raised portion 34, can travel from the inlet 28 to the outlet 32 by passing through the first opening 36 and the associated pipe 42, thence into the treatment compartment, thence through the treatment compartment to the bottom of the pipe 48, thence upwardly through the pipe 48 and the opening 40, thence to the outlet 32 for discharge.

In the embodiment illustrated, the opening 40 (i.e. the opening on the "outlet" side of the weir constituted by the raised portion 34) has an internal diameter large enough to allow passage of a maintenance worker from the by-pass compartment 24 into the treatment compartment 26.

Still looking at FIG. 1, it will be seen that the top wall 18 of the container 12 provides an access opening 52 which is offset with respect to the axis of the circular top wall 18, such that it approximately overlies the position of the opening 40. A cover and grate 54 is provided to close the access opening 52. By generally aligning the opening 52 with the opening 40, it is possible to carry out inspection, sampling and the pumping out of the entire contents of the treatment compartment 26 from a position above the access opening 52, thus making it unnecessary, at least for a large number of maintenance tasks, for a worker to actually enter the container 12.

However, to facilitate the work of personnel that do need to enter the containers for cleaning and other purposes, a standard ladder 56 is anchored into the cylindrical side wall 16 of the container 12.

Also shown in FIG. 1 is a vent pipe 60, which rises adjacent the inside surface of the cylindrical side wall 16 of the container, and which can be protected by the ladder 56, as seen in FIG. 2.

Although the illustrated embodiment shows the larger opening through the partition 22 to be that adjacent the outlet 32, i.e. the opening 40, the larger opening could also be adjacent the inlet, simply by reconfiguring the size and disposition of the weir constituted by the raised portion 39.

It is preferred, but not essential, that the upper surface 30 of the partition 22 lie substantially in a single horizontal plane.

The internal diameter of the pipe 48 should be at least about 20 inches and preferably 24 inches.

In use, low-flow liquid entering at the inlet 28 will be constrained by the weir (raised portion 34) to pass downwardly through the opening 36 and into the treatment chamber 26. The liquid will gradually accumulate in the compartment 26 until it reaches the bottom of the pipe 48. Continuing inflow through the opening 36 will gradually compress the air located under the partition 22 (at locations other than the openings 36 and 40). Floating contaminants like oil, grease, etc. will tend to accumulate under the partition 34, thus trapping them in this position and not allowing them to rise up along the larger pipe 48 to gain access to the outlet 32.

While one embodiment of this invention has been illustrated in the accompanying drawings and described hereinabove, it will be evident to those skilled in the art that changes and modifications may be made therein, without department from the essence of this invention, as set forth in the appended claims.

The embodiments of the invention in which an exclusive property or privilege is claimed are defined as follows:

1. A tank interceptor for rainwater and waste-water, comprising:

a container including a bottom wall, a side wall and a top wall, said walls defining an internal chamber, a partition dividing the chamber into a by-pass compartment above the partition and a treatment compartment below the partition, the partition having an upper surface, an inlet through the side wall adjacently above said upper surface of the partition, the inlet being adapted to permit liquid to flow into the by-pass compartment, an outlet through the side wall adjacently above the upper surface of the partition, the outlet being adapted to permit liquid to flow out of said by-pass compartment, the upper surface of the partition being configured to include a raised portion which isolates the inlet from the outlet, while being spaced from the top wall of the container, the raised portion requiring that liquid entering through the inlet and seeking to reach the outlet through the by-pass compartment must overflow the raised portion in order to do so, first and second openings through the partition on the inlet side and the outlet side, respectively, of the raised portion, a first pipe commencing substantially at said first opening, extending downward therefrom, and opening into said treatment compartment at an intermediate vertical location therein, a second pipe commencing substantially at said second opening, extending downward therefrom, and opening into said treatment compartment at an intermediate vertical location therein, whereby said openings and pipes communicate the by-pass compartment with the treatment compartment, the openings and corresponding pipes being such that liquid, without having to overflow said raised portion, can travel from the inlet to the outlet by passing through the first opening into the treatment compartment, thence through the treatment compartment, thence through the second opening into the by-pass compartment, thence to the outlet, one of said openings and the corresponding pipe having an internal diameter large enough to allow passage of a maintenance worker from said by-pass compartment into said treatment compartment, an access opening through the top wall of the container, positioned such that maintenance personnel can, without having to enter the container, pass a snorkel through the access opening and said one of the openings in the partition, in order to pump out the contents of the treatment compartment.

2. The tank interceptor claimed in claim 1, in which said one of said openings is the second opening, said access opening through the top wall of the container being generally aligned with said one of said openings.

3. The tank interceptor claimed in claim 2, in which the upper surface of the partition lies substantially in a single horizontal plane except for said raised portion, said raised portion having the shape of an elongate weir, the weir.

4. The tank interceptor claimed in claim 3, in which the internal diameter of said second pipe is at least 20 inches.

5. The tank interceptor claimed in claim 1, in which the upper surface of the partition lies substantially in a single horizontal plane except for said raised portion, said raised portion having the shape of an elongate weir, the weir.

6. The tank interceptor claimed in claim 1, in which the internal diameter of said second pipe is at least 20 inches.

7. The tank interceptor claimed in claim 1, in which means are provided for venting the treatment compartment to the atmosphere.

* * * * *